A. E. BERGEY.
MECHANISM FOR DRIVING TOOLS.
APPLICATION FILED DEC. 19, 1918.
1,413,094.
Patented Apr. 18, 1922.
2 SHEETS—SHEET 1.
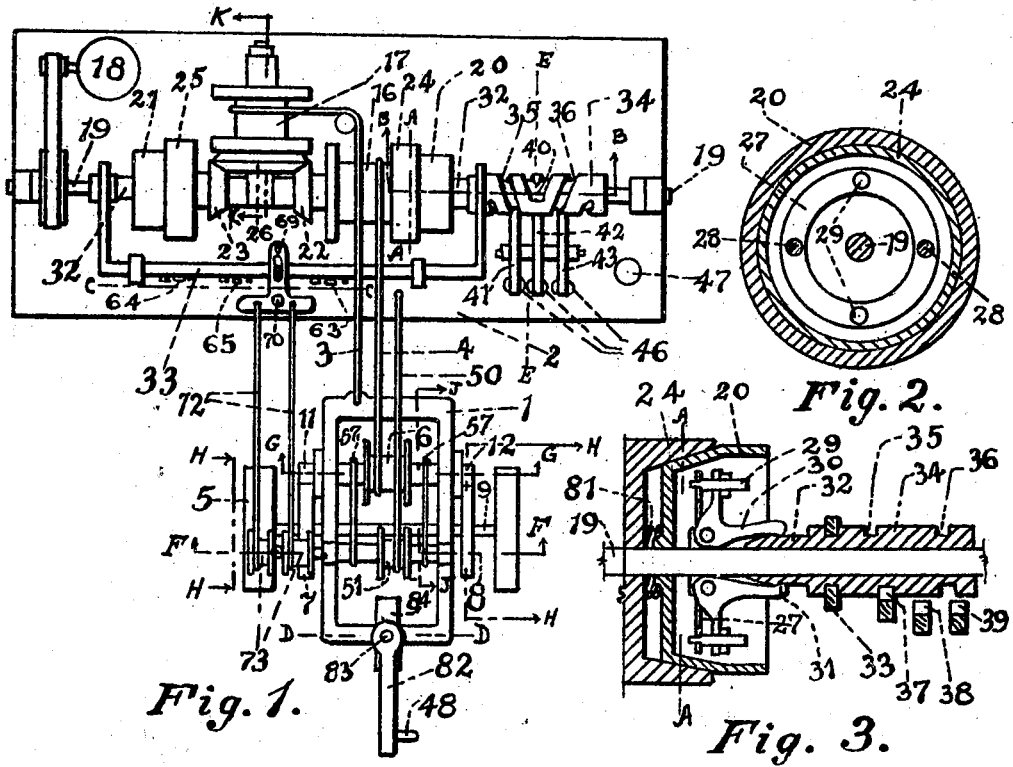
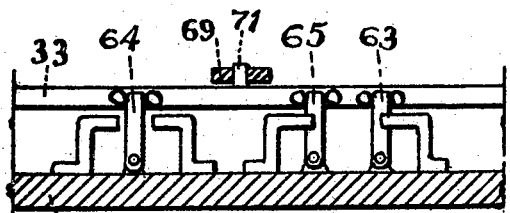
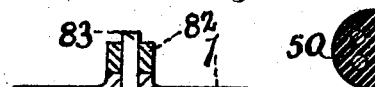
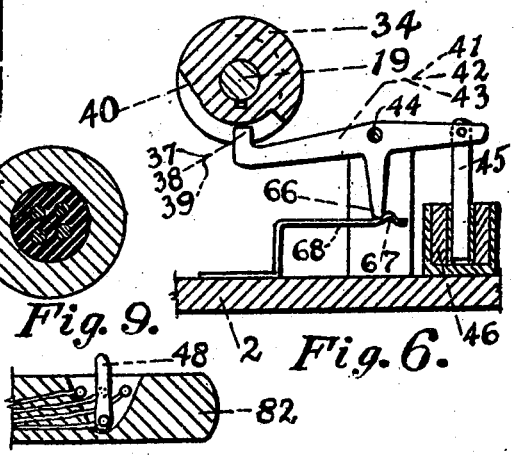
Witnesses.
Malinda Bergey.
Florence Bergey.
Inventor.
Aaron E. Bergey

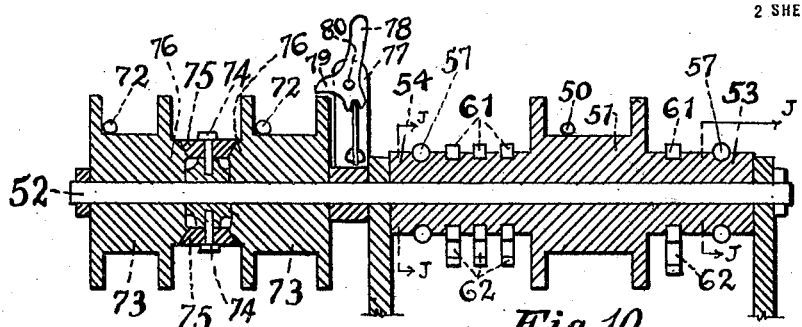
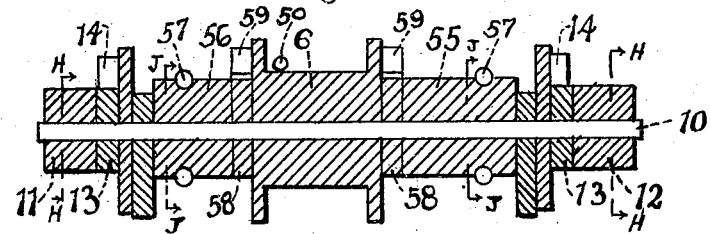
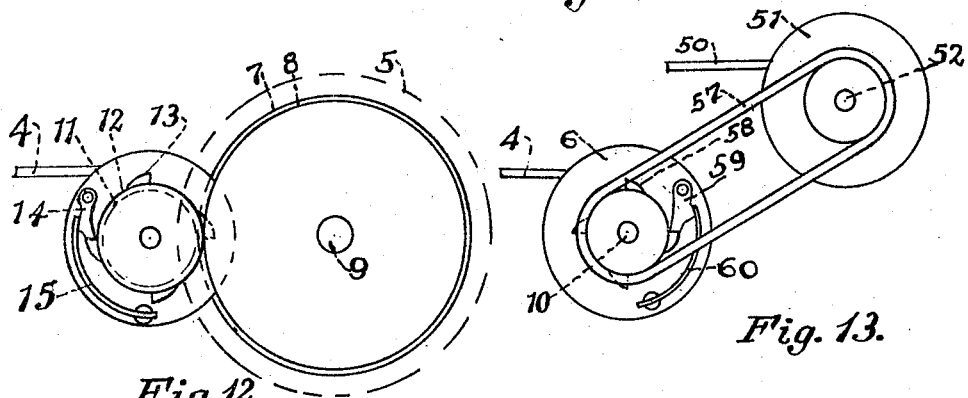
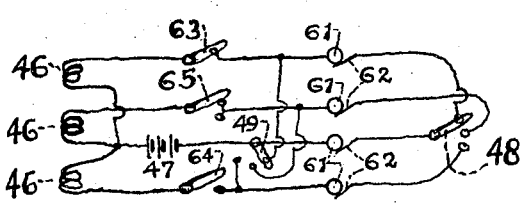
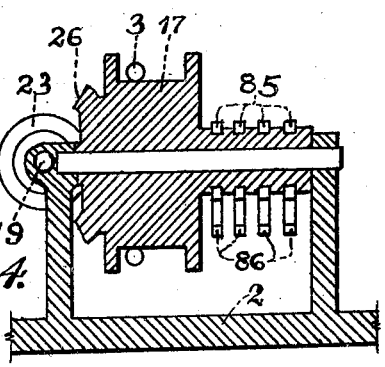

UNITED STATES PATENT OFFICE.

AARON E. BERGEY, OF BAZETTA TOWNSHIP, TRUMBULL COUNTY, OHIO.

MECHANISM FOR DRIVING TOOLS.

1,413,094.

Specification of Letters Patent. Patented Apr. 18, 1922.

Application filed December 19, 1918. Serial No. 267,539.

*To all whom it may concern:*

Be it known that I, AARON E. BERGEY, a citizen of the United States, residing in Bazetta Township, in the county of Trumbull and State of Ohio, have invented a new and useful Mechanism for Driving Tools, of which the following is a specification.

My invention relates to mechanisms for driving tools in which power is supplied to the tool by means of a reel, and a rope or chain. It is intended to be used chiefly for driving agricultural implements, but may be used for other purposes. The objects of my invention are to provide a mechanism that will drive the tool away from the main frame as well as towards the main frame, to provide an improved form of control mechanism, and to provide such other improved devices as are more fully described hereinafter.

I attain these objects by the mechanism illustrated in the accompanying drawings, in which—

Fig. 1 is a plan, Fig. 2 is a section on the line AA showing the clutch members and clutch spring, Fig. 3 is a section on the line BB showing the clutch members and part of the shifting mechanism, Fig. 4 is a section on the line CC showing the breaker switches, Fig. 5 is a section on the line DD showing part of the steering mechanism, Fig. 6 is a section on the line EE, Fig. 7 is a section through the end of the control handle showing the control switches, Fig. 8 is a cross section through the electric control cable, Fig. 9 is a cross section through a special form of driving-in rope, Fig. 10 is a section on the line FF showing part of the control mechanism, Fig. 11 is a section on the line GG through the tool frame reel, Fig. 12 is a cross section on the line HH showing the connecting gear between the tool frame reel and the traction mechanism, Fig. 13 is a cross section on the line JJ showing the connecting gear between the tool frame reel and the control shaft, Fig. 14 is a section on the line KK, and Fig. 15 is a diagram of the electric wiring.

Similar characters refer to similar parts throughout the several views.

1 is the tool frame. It is constructed so that various tools, such as harrows, plows, and the like, may be attached thereto.

2 is the main frame. On it is mounted the main portion of the driving mechanism. It is constructed so that various tools, such as harrows, plows, and the like, may be attached thereto.

3 is the driving-in rope. It connects the frames 1 and 2. When it is driven by a suitable driving-in mechanism it will drive one of the frames towards the other. If the frame 1 is anchored securely to the ground, the frame 2 will be moved along the ground towards the frame 1, and if the frame 2 is anchored securely to the ground, the frame 1 will be moved along the ground towards the frame 2. Hereafter in this specification, for the purpose of clearness, it is assumed that the frame 2 is anchored securely to the ground. The driving-in mechanism for driving the rope 3 is preferably made in the form of a reel mounted on the frame 2. It is convenient to call this reel the driving-in reel. It is convenient to call the driving-in reel, together with the driving-in rope, the driving-in reel gear.

4 is the driving-out rope. Its one end is attached to the driving-out reel which is mounted on the frame 2. Its other end is attached to the tool frame reel which is mounted on the frame 1.

5 is the traction mechanism. It is mounted on the frame 1, and is adapted to exert tractive effort on the ground. It may be of any suitable variety, such as, for example, an endless track, or a traction wheel. The latter is shown in the drawings.

The traction mechanism and the tool frame reel are connected by means of gearing so as to run in unison. So are also the driving-in reel and the driving-out reel. Hence the ropes 3 and 4 are connected at both ends to run in unison. It is convenient to call the traction mechanism 5 and the ropes 3 and 4, together with the connecting gearing, the main driving gear.

The arrangement of parts is made such that when the main driving gear is running forwardly, the driving-in rope 3 is reeled in on the main frame 2, the frame 1 is driven towards the frame 2, the traction mechanism 5 is driven through contact with the ground, the tool frame reel is driven by the traction mechanism 5 and reels the driving-out rope 4 in on the frame 1 and out from the frame 2, where the rope 4, through the driving-out reel and the driving-in reel, helps to drive the rope 3. The amount of power thus returned by the rope 4 to the rope 3, depends on the speed and tension of the ropes. Power that is not used by the tools of the frame 1, or by friction, is thus returned. When the main driving gear is running backwardly, the rope 4 is reeled in on the frame 2 and out from the frame 1, thus driving the traction mechanism 5 so as to drive the tool frame 1 away from the main frame 2, the rope 3 is reeled out from the frame 2, where it returns some power to the rope 4 through the driving-in reel, driving-out reel, and connecting gear. The amount of this power depends on the speed and tension of the ropes 3 and 4.

It is very desirable that the ropes 3 and 4 always remain taut. For if they sag down too much, they will rub on the ground and cause undue wear and loss of power.

I provide mechanism for maintaining the ropes taut, both when running forwardly and when running backwardly. I prefer to use a slip-drive gear. This consists of two driving members in the main driving gear, which are forced, when driving, to slip somewhat at their point of mutual drive, and which are so proportioned that there is considerable resistance to slipping. The slip-drive gear may be located at any suitable point in the main driving gear, but I prefer to construct the slip-drive gear so that the slipping will take place at the point of contact between the traction mechanism and the ground, since some slipping will take place there in any case.

6 is the tool frame reel. It may be of any suitable type. I have shown in the drawings, a spool mounted on the frame 1. It is connected, by means of suitable gearing, to run in unison with the traction mechanism 5 at one relative speed when running forwardly, and at another relative speed when running backwardly.

7 and 8 are gear wheels running in unison with the traction mechanism 5. The drawings show the members 5, 7, and 8 attached to a common shaft.

9 is the shaft to which the members 5, 7, and 8 are attached. It is revolvably mounted on the frame 1.

10 is the shaft to which the spool 6 is attached. It is revolvably mounted on the frame 1.

11 and 12 are pinions rotatably mounted on the shaft 10. They are adapted to run in mesh with the gear wheels 7 and 8, respectively. The pinions 11 and 12 and the gear wheels 7 and 8 run in unison. The gear ratio of the pinion 12 to the gear wheel 8 is somewhat greater than that of the pinion 11 to the gear wheel 7. Hence the pinion 11 revolves faster than the pinion 12. The pinions 11 and 12 are each connected with the spool 6, by means of a pawl-and-ratchet drive gear such that when the main driving gear is running forwardly, the traction mechanism 5 will drive the spool 6 through the members 11 and 7, the spool 6 revolving faster than the pinion 12; and when the main driving gear is running backwardly the spool 6 will drive the traction mechanism 5 through the members 8 and 12, the pinion 11 now revolving faster than the spool 6.

The proportion of parts is made such that when the main driving gear is running forwardly, the rope 3 will tend to drive the traction mechanism 5 at a speed somewhat greater than is allowed by the rope 4; and when the main driving gear is running backwardly, the rope 4 will tend to drive the tool frame 1, through the members 12, 8, 5, and the ground, at a speed somewhat greater than is allowed by the rope 3. In both cases the traction mechanism must slip somewhat on the ground. Thus the ropes 3 and 4 will always remain taut.

13 are two ratchet wheels attached to and revolving with the pinions 11 and 12, one for each.

14 are two pawls revolving with the spool 6. They are secured to the shaft and adapted to drive the ratchet wheels 13, one for each.

15 are springs adapted to keep the pawls 14 in engagement with the ratchet wheels 13, when driving.

16 is the driving-out reel. It is mounted on the frame 2 and is adapted to reel the rope 4 in on, and out from, the frame 2. It is preferably made in the form of a spool, as shown in the drawings.

It is convenient to call the driving-out reel and the tool frame reel, together with the driving-out rope, the driving-out reel gear.

17 is the driving-in reel. It is mounted on the frame 2, and is adapted to reel the rope 3 in on, and out from, the frame 2. It is preferably made in the form of a spool, as shown in the drawings.

The spools 16 and 17 are connected by means of suitable gearing so as to run in unison.

I provide a forwardly driving mechanism adapted to drive the main driving gear forwardly, and a backwardly driving mechanism adapted to drive the main driving gear backwardly. I provide a control mechanism for connecting the main driving gear to either of the driving mechanisms, and for disconnecting it from both. This control mechanism is controllable from the frame 1 by the operator.

18 is a motor. It is mounted on the frame 2 and is adapted to drive the main driving gear. It may be of any suitable type. In case the frame 2 is mounted on a self-propelling vehicle, such as an automobile, farm tractor, etc, the motor 18 may be the motor of the self-propelling vehicle.

19 is a drive shaft. It is mounted on the frame 2 and is driven by the motor 18 through suitable gearing, belt gearing being indicated in the drawings.

20 and 21 are two clutch members revolving with the shaft 19.

22 and 23 are two bevel pinions revolvably mounted on the shaft 19. The spool 16 is attached to and revolves with the pinion 22.

24 and 25 are two clutch members revolving with the pinions 22 and 23, respectively. They are adapted to engage with the members 20 and 21, respectively.

The clutches 20, 24 and 21, 25 may be of any suitable type, cone friction clutches being shown in the drawings.

The clutch 21, 25 is the forwardly driving clutch, and the clutch 20, 24 is the backwardly driving clutch. Hence when the former is engaged, the tool frame 1 is being driven in, and when the latter is engaged, the frame 1 is being driven out.

26 is a bevel gear attached to and revolving with the spool 17. It runs in mesh with the pinions 22 and 23, which latter are thus forced to run in opposite directions.

27 are the main clutch springs.

28 are pins attached to the clutch members 20 and 21. They are adapted to transmit end pressure and torque from the springs 27 to the members 20 and 21.

29 are clutch fingers attached to the clutch levers. They are adapted to transmit end pressure and torque from the clutch levers to the springs 27.

30 are the clutch levers. They can rock on pins rigidly attached to the shaft 19.

31 are tappets formed on the levers 30.

32 are the clutch cams. They are adapted to engage the tappets 31 so that when the cams 32 are moved towards the clutch members the corresponding clutch becomes engaged, and when they are moved away from the clutch members the corresponding clutch becomes disengaged.

33 is a yoke bar. At its ends are formed yokes adapted to turn in corresponding grooves in the cams 32. Thus the cams 32 must move in unison longitudinally. The yoke bar 33 can assume three positions. In the right position the clutch 21, 25 is engaged and the clutch 20, 24 is disengaged, in the middle position both clutches are disengaged, and in the left position the clutch 20, 24 is engaged while the clutch 21, 25 is disengaged.

I provide both a mechanical and an electro-mechanical control mechanism for operating the clutches. I shall first describe the electro-mechanical control mechanism.

34 is a shift cam sleeve. It can slide longitudinally but cannot turn on the shaft 19. It is connected to move in unison longitudinally with the cams 32, and yoke bar 33.

35 and 36 are cams formed on the sleeve 34. They are adapted to be engaged by tappets so as to move the sleeve longitudinally.

37, 38, and 39 are tappets adapted to engage the cams on the sleeve 34. The tappets 37 and 38 are adapted to engage the cam 35 so as to move the sleeve 34 to the left. The tappets 38 and 39 are adapted to engage the cam 36 so as to move the sleeve 34 to the right. The arrangement of parts is such that when the tappet 37 is engaged with the cam 35, the yoke bar 33 assumes the left position, the clutch 20, 24 becomes engaged and the clutch 21, 25 becomes or remains disengaged; when the tappet 38 is engaged either with the cam 35 or the cam 36, the yoke bar 33 is forced to its middle position, and both clutches become disengaged; and when the tappet 39 is engaged, the yoke bar 33 is forced to its right position, the clutch 21, 25 becomes engaged and the clutch 20, 24 becomes or remains disengaged.

40 is a radial cam formed on the sleeve 34. It serves to push the tappets 37, 38, and 39 radially outward from the sleeve 34 after the clutches have been shifted to their proper position.

41, 42, and 43 are tappet levers to which the tappets 37, 38, and 39 are attached, respectively.

44 is a shaft on which the levers 41, 42, and 43 can rock so as to engage or disengage the tappets with the corresponding cams.

45 are plungers attached to the levers 41, 42, and 43, one to each.

46 are solenoids adapted to pull the plungers 45 when an electric current is passed through the solenoids. Thus the tappets can be engaged with the cams. They are disengaged by the cam 40.

47 is a device for generating electric current. This may be any device suitable for the purpose. An electric battery is indicated in the drawings.

48 is an electric switch. By means of it the operator can energize any one of the three solenoids, as may be seen from the electric wiring diagram. It is located on the frame 1, so that the operator may control the clutch shifting mechanism without leaving the frame 1.

49 is a similar switch located on the frame 2. Thus the operator can control the clutch shifting mechanism from the frame 2.

50 is an electric cable connecting the frames 2 and 1. It contains four conductors, one for the return part of the electric circuit, and one for each of the three solenoids.

51 is an electric cable winding spool. It is preferably located on the frame 1. For the frame 1 is the frame which, as a rule, moves along the ground; and if the spool 51 were mounted on the frame 2, the cable 50 would have to move along the ground, thus tending, for long spans, to rub along the ground and spoil the insulation.

52 is the control shaft. It is attached to and revolves with the spool 51.

The spool 51 is connected with the spool 6 by gearing so that either spool may drive the other. While ordinary gearing may be used for this purpose, I prefer to use the slip-drive gear shown in the drawings.

53 and 54 are pulleys attached to and revolving with the spool 51.

55 and 56 are pulleys mounted on the shaft 10. They are connected with the shaft 10 by one-way pawl-and-ratchet drive mechanisms.

57 are two belts. One connects the pulleys 53 and 55. The other connects the pulleys 54 and 56.

58 are two ratchet wheels attached to and revolving with the pulleys 55 and 56, one for each.

59 are two pawls attached to and revolving with the spool 6. They are adapted to drive and be driven by the ratchet wheels 58.

60 are two springs adapted to keep the pawls 59 in engagement with the ratchet wheels 58, when driving.

The gear ratio of the pulley 56 to the pulley 54 is somewhat greater than that of the pulley 55 to the pulley 53. The arrangement of parts is such that when the frame 1 is being driven in, the spool 6 will tend to drive the spool 51, through the pulley 56, belt 57, and pulley 54, at a speed somewhat greater than is allowed by the cable 50, thus causing some slip of the belt, the pulley 55 revolving somewhat faster than the spool 6. When the frame 1 is being driven out, the cable 50, in reeling off from the spool 51, will tend to drive the pulley 55, through the pulley 53 and belt 57, at a speed somewhat greater than is allowed by the spool 6, thus causing some slip of the belt, the pulley 56 revolving somewhat more slowly than the spool 6. It will be seen that by this arrangement the cable 50 always remains taut, and is thus, as a rule, prevented from sagging far enough to touch the ground.

61 are collector rings revolving with the spool 51. To them are attached the ends of the conductors of the cable 50.

62 are brushes having electrical contact with the collector rings 61. They are connected with the terminals of the switch 48. Thus electrical contact is maintained between the fixed and the moving parts of the conductors.

63, 64, and 65 are breaker switches adapted to break the circuits through the left, middle, and right solenoids, respectively. They are operated by the yoke bar 33. The arrangement of parts is made such that when the yoke bar is in the left position the switches 64 and 65 are closed and the switch 63 is open; when the yoke bar is in the middle position, the switches 63 and 65 are closed and the switch 64 is open; and when the yoke bar is in the right position, the switches 63 and 64 are closed and the switch 65 is open. It will be seen that by this arrangement the electric current through any particular solenoid is broken automatically as soon as its function has been performed. Thus useless waste of current and wear of parts is prevented.

When the switch 48 is used, the switch 49 is set so that all circuits at that switch are open. When the switch 49 is used the switch 48 is set with all its circuits open.

66 are three dogs attached to the tappet levers 41, 42, and 43, one to each.

67 are three V-shaped teeth adapted to engage with the dogs 66, one with each.

68 are three springs adapted to keep the dogs 66 in engagement with the teeth 67.

The members 66, 67, and 68 form a detent which is adapted to prevent the tappets 37, 38, and 39 from engaging or disengaging on account of undue causes, such as vibration, etc.

I shall now describe the mechanical control mechanism.

69 is a lever mounted on the frame 2.

70 is a pin or shaft on which the lever 69 can rock.

71 is a removable pin attached to the yoke bar 33. It is adapted to project through a slot in an arm of the lever 69 so that when the lever 69 is rocked back and forth the yoke bar 33 will be moved right and left so as to engage and disengage the clutches 20, 24 and 21, 25 in a manner previously described.

72 are two control ropes attached to two arms of the lever 69. At their other ends they are attached to two control spools.

73 are two control spools to which the ropes 72 are attached. They are mounted on the shaft 52. They are connected with each other by a suitable balancing gear such that when one spool turns forwardly on the shaft 52, the other turns backwardly, and vice versa.

74 are pins extending radially outward from the shaft 52 and revolving therewith.

75 are bevel pinions adapted to revolve on the pins 74.

76 are bevel gears revolving with the spools 73, one with each. They mesh with the pinions 75 so that when one of the spools 73 revolves in one direction on the shaft 52, the other of the spools is forced to revolve in the opposite direction.

The diameter of the spools 73 is made the same as that of the spool 51 so that the ropes 72 may always remain taut.

77 is a lever revolvably mounted on the shaft 52.

78 is a lever mounted on the lever 77.

79 is a dog attached to the lever 78.

80 is a pin on which the lever 78 can rock.

The arrangement of parts is such that when the lever 78 is pushed to the left it will cause the dog 79 to engage one of the spools 73 thus causing the lever 77 and the said spool to revolve in unison on the shaft 52.

It will be seen that when the frame 1 is being driven out and the spool 73 is held stationary in the frame 1 by the mechanism just described, the lever 69 will move the yoke bar 33 to the right thus disengaging the clutch 20, 24, and bringing the frame 1 to a stop. If the lever 77 is now pulled backwardly at the top, the lever 69 will move the yoke bar 33 still farther to the right thus engaging the clutch 21, 25 and so driving the frame 1 in towards the frame 2. When the frame 2 is being driven in and the spool 73 is held stationary in the frame 1, the clutch 21, 25 will be disengaged.

If the pin 71 is removed from the yoke bar 33, the lever 69 can move independently of the yoke bar. The operator may then connect the lever 69, by means of suitable link mechanism with any object or mechanism on the frame 2, that he may choose.

81 is a light spring placed between the clutch members 20 and 24. It serves to keep the clutch members from rubbing when the clutch is disengaged. A similar spring is placed between the members 21 and 25.

The frame 1 may be supported on the ground in any convenient manner. I have shown two wheels in addition to the traction mechanism. One is a wheel that can turn on a suitable spindle as shown in Fig. 5. Thus the frame 1 may be guided so as to move in different directions, the other wheel revolving on the shaft 9 whenever necessary.

Each cam 32 has a high spot over which the tappets 31 pass when the corresponding clutch is being engaged. Hence the clutch will not become disengaged unless acted on by the shifting mechanism.

As to the mechanism for steering the tool frame 1, any suitable mechanism may be used for this purpose. In the mechanism shown in the drawings,—

82 is a handle on which the control switch 48 may be mounted.

83 is a spindle to which the handle 82 is attached. The spindle 83 can turn in the frame 1, and is provided with a fork for the wheel which guides the frame 1.

84 is a steering wheel, turning with the spindle 83.

In case the special rope shown in Fig. 9 is used, the electric current for operating the electro-mechanical control mechanism may pass through the conductors in the rope 3, electrical contact between the moving and fixed parts of the circuit being maintained through the collector rings and brushes shown in Fig. 14.

85 are collector rings attached to and revolving with the spool 17.

86 are brushes working in conjunction with the collector rings 85.

It will be seen that if the special rope is used, the cable 50 and its reeling apparatus may be dispensed with. This arrangement may be used for small tools and intermittent work.

With regard to that part of the traction mechanism which gets a grip on the ground, this may be of any suitable variety, such as cones, lugs, or ribs attached to the surface of the traction mechanism.

As to gear wheels, they are shown somewhat diagrammatically in the drawings. They may be toothed wheels, or plain wheels; or, of course, chain and sprocket drive may be used.

I claim:—

1. In a mechanism for driving tools, a tool frame, a traction mechanism mounted on the said tool frame, a tool frame reel mounted on the said tool frame, and a tool frame connecting gear, said tool frame connecting gear being constructed so as to cause the said traction mechanism and the said tool frame reel to run in unison at one relative speed when running forwardly and at another relative speed when running backwardly, substantially as described.

2. In a mechanism for driving tools, a main frame, a tool frame, a traction mechanism mounted on the said tool frame, a driving-in reel gear adapted to drive the said tool frame towards the said main frame, and a driving-out reel gear adapted to drive the said tool frame away from the said main frame by means of the said traction mechanism, substantially as described.

3. In a mechanism for driving tools, a main frame, a tool frame, a traction mechanism mounted on the said tool frame, a driving-in rope, a driving-in reel mounted on the said main frame and adapted to drive the said tool frame towards the said main frame by means of the said driving-in rope, a tool frame reel mounted on the said tool frame and adapted to drive the said traction mechanism, a driving-out rope, and a driving-out reel mounted on the said main frame and adapted to drive the said tool frame away from the said main frame by means of the said driving-out rope and the said tool frame reel and the said traction mechanism, substantially as described.

4. In a mechanism for driving tools, a main frame, a tool frame, a traction mechanism mounted on the said tool frame, a driving-in reel gear adapted to drive the said tool frame towards the said main frame, a driving-out reel gear adapted to drive the said tool frame away from the said main frame by means of the said traction mechanism, and a connecting gear, said connecting gear being constructed so that when it is running forwardly the said driving-in reel gear will tend to drive the said traction mechanism at a speed somewhat greater than is allowed by the said driving-out reel gear and when it is running backwardly the said driving-out reel gear will tend to drive the said tool frame at a speed somewhat greater than is allowed by the said driving-in reel gear, substantially as described.

5. In a mechanism for driving tools, a main frame, a tool frame, a traction mechanism mounted on the said tool frame, a driving-in reel gear adapted to drive the said tool frame towards the said main frame, a driving-out reel gear adapted to drive the said tool frame away from the said main frame by means of the said traction mechanism, and means for maintaining the driving ropes of the said reel gears taut both when running forwardly and when running backwardly, substantially as described.

6. In a mechanism for driving tools, a main frame, a tool frame, a traction mechanism mounted on the said tool frame, a driving-in reel gear adapted to drive the said tool frame towards the said main frame, a driving-out reel gear adapted to drive the said tool frame away from the said main frame by means of the said traction mechanism, a forwardly driving mechanism adapted to drive the said reel gears in unison forwardly, a backwardly driving mechanism adapted to drive the said reel gears in unison backwardly, and a control mechanism adapted for connecting the said reel gears with either of the said driving mechanisms and for disconnecting the said reel gears from either of the said driving mechanisms, said control mechanism being controllable from the said tool frame, substantially as described.

7. In a mechanism for driving tools, a main frame, a tool frame, a traction mechanism mounted on the said tool frame, a driving-in reel gear adapted to drive the said tool frame towards the said main frame, a driving-out reel gear adapted to drive the said tool frame away from the said main frame by means of the said traction mechanism, a forwardly driving mechanism adapted to drive the said reel gears in unison forwardly, a backwardly driving mechanism adapted to drive the said reel gears in unison backwardly, an electric switch mounted on the said tool frame, and a control mechanism adapted to connect the said reel gears with either of the said driving mechanisms and to disconnect the said reel gears from both of the said driving mechanisms, said control mechanism being constructed so as to be controlled by means of the said electric switch, substantially as described.

8. In a mechanism for driving tools, a main frame, a tool frame, a traction mechanism mounted on the said tool frame, a driving-in reel gear adapted to drive the said tool frame towards the said main frame, a driving-out reel gear adapted to drive the said tool frame away from the said main frame by means of the said traction mechanism, a forwardly driving mechanism adapted to drive the said reel gears in unison forwardly, and a backwardly driving mechanism adapted to drive the said reel gears in unison backwardly, substantially as described.

9. In a mechanism for driving tools, a main frame, a tool frame, a traction mechanism mounted on the said tool frame, a driving-in reel gear adapted to drive the said tool frame towards the said main frame, a driving-out reel gear adapted to drive the said tool frame away from the said main frame by means of the said traction mechanism, and a steering mechanism mounted on the said tool frame and adapted for steering the said tool frame, substantially as described.

10. In a mechanism for driving tools, a main frame, a tool frame, a traction mechanism mounted on the said tool frame, a driving-in reel gear adapted to drive the said tool frame towards the said main frame, a driving-out reel gear adapted to drive the said tool frame away from the said main frame by means of the said traction mechanism, a forwardly driving mechanism adapted to drive the said reel gears in unison forwardly, a backwardly driving mechanism adapted to drive the said reel gears in unison backwardly, and a steering mechanism mounted on the said tool frame and adapted for steering the said tool frame substantially as described.

11. A mechanism of the class described, comprising a power plant having a series of drums, a movable frame separate therefrom, a drum carried by said frame, and means connecting said drums for transmitting power from the power plant to said frame for moving the same in opposite directions, substantially as described.

12. A mechanism of the class described, comprising a power plant, a movable frame, a reel gear adapted to drive said frame in opposite directions from said power plant, control drums relatively rotatable, means for producing relative rotation of said drums, said relative rotation controlling the operation of the power plant, substantially as described.

13. A mechanism of the class described, comprising a tractor adapted to carry a tool, flexible means connected to the frame of the said tractor and extending rearwardly therefrom for moving the frame in one direction, a drum on said frame, means operatively connecting said drum to said tractor for moving the frame in the opposite direction when said drum is rotated in the proper direction, and a second flexible means co-operating with said drum and extending rearwardly therefrom for rotating the same, substantially as described.

14. A mechanism of the class decribed, comprising a tractor, flexible means connected to the frame of said tractor and extending rearwardly therefrom for moving the frame in one direction, a drum on said frame, means operatively connecting said drum to said tractor for moving the frame in the opposite direction when said drum is rotated in the proper direction, a second flexible means co-operating with said drum and extending rearwardly therefrom for rotating the same, and drums co-operating with said rearwardly extending flexible means for winding and unwinding the same to move said frame, substantially as described.

15. A mechanism of the class described, comprising a relatively stationary frame, a movable frame separate therefrom, flexible means extending directly between said frames and connected to said frames only, means on said first mentioned frame for moving certain of said flexible means in one direction for producing an outward movement of said relatively movable frame and for moving other of said flexible means to produce an inward movement of said relatively movable frame, and means on said relatively movable frame for controlling the direction of movement thereof, substantially as described.

16. A mechanism of the class described, comprising a power plant, a movable frame separate therefrom, a reel gear adapted to drive said frame in opposite directions from said power plant, relatively rotatable drums on said movable frame, and means for producing relative rotation of said drums, said relative rotation controlling the operation of the power plant, substantially as described.

AARON E. BERGEY.

Witnesses:
MALINDA BERGEY,
FLORENCE BERGEY.